United States Patent
Bourque

[15] 3,659,290
[45] Apr. 25, 1972

[54] APPARATUS FOR PROVIDING SENSITIVITY-TIME CONTROL FOR RADAR RECEIVERS

[72] Inventor: Edward L. Bourque, Dunstable, Mass.
[73] Assignee: Sanders Associates, Inc., Nashua, N.H.
[22] Filed: Aug. 3, 1970
[21] Appl. No.: 60,496

[52] U.S. Cl................................................343/5 SM, 343/8
[51] Int. Cl.............................................................G01s 7/34
[58] Field of Search....................................343/5 R, 5 SM, 8

[56] References Cited

UNITED STATES PATENTS 3,149,333   9/1964   Campbell.....................................343/8

*Primary Examiner*—T. H. Tubbesing
*Attorney*—Louis Etlinger

[57] ABSTRACT

Sensitivity-time control for radar receivers is provided by arranging attenuators having attenuation values inversely proportional to range at the input lines of the range gate channels of the receiver.

7 Claims, 5 Drawing Figures

INVENTOR.
EDWARD L. BOURQUE

APPARATUS FOR PROVIDING SENSITIVITY-TIME CONTROL FOR RADAR RECEIVERS

The invention herein described was made in the course of or under a contract or subcontract thereunder with the Department of the Army.

BACKGROUND OF THE INVENTION

In a radar receiver employing multiple range-gated channels, it is necessary to provide some means for maintaining output levels of relatively constant amplitude. Otherwise, echo signals from nearby targets can overload the system. Also, it is much simpler to provide processing circuitry wherein the signals to be processed are of relatively constant value.

Normally, the gain of the receiver is varied as a function of time, and this technique is called sensitivity-time control or STC. To accomplish this function, an STC modulator is inserted in the receiver chain and controlled from an STC generator providing an input signal for attenuating the signal applied to the STC modulator proportional to range. The employment of such a system has its problems principally, leakage from the STC generator waveform into the signal path, complexity of the STC generator and modulator, and the requirement that the STC generator and modulator must be aligned. Furthermore, since the STC modulator is made up of active components which tend to drift, the modulator requires periodic adjustment.

SUMMARY OF THE INVENTION

Accordingly, it is an object of this invention to provide a simplified sensitivity-time control for radar receivers.

It is another object of this invention to provide sensitivity-time control for a radar receiver using only passive components.

Briefly, sensitivity-time control or STC is provided in radar receiver by providing attenuator pads intermediate the video amplifier of the receiver and each of the range gate channels. Signals from close-in targets are attenuated greatly while signals from far away targets are attenuated only slightly or not at all. Alternatively, the inputs to the various range gate channels are tapped at various stages of the video amplifier whereby close-in signals will be amplified only slightly and far away signals will be amplified greatly. In a third embodiment, the techniques of using different amounts of video amplification and attenuation are combined.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENT

Figure 1:
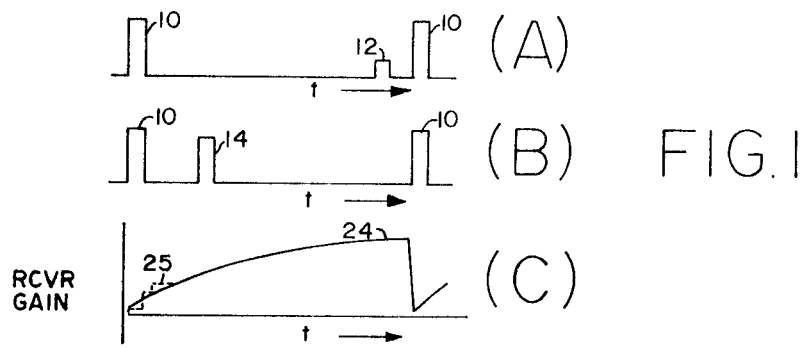
FIG. 1 is a series of waveshapes illustrating the principle of sensitivity-time control.

The waveforms of FIG. 1 illustrate the problem of radar receivers and the necessity for STC modulation. Referring to waveform A, signal 10 is a pulse which is transmitted from a radar system, radiated towards a far target and is reflected therefrom and returned as pulse 12, having a relatively low amplitude. In waveform B of FIG. 1, the pulse 10 is transmitted and reflected from a closer target, as shown by larger pulse 14. Obviously, pulse 14 from the closer target is a much stronger signal than pulse 12. In fact, it is not uncommon for the dynamic range of the system or the ratio of the maximum signal received to the minimum signal to be on the order of 10,000. Previously, all the signals received have been made relatively constant by employing active STC modulation in the manner illustrated in FIG. 2.

Figure 2:
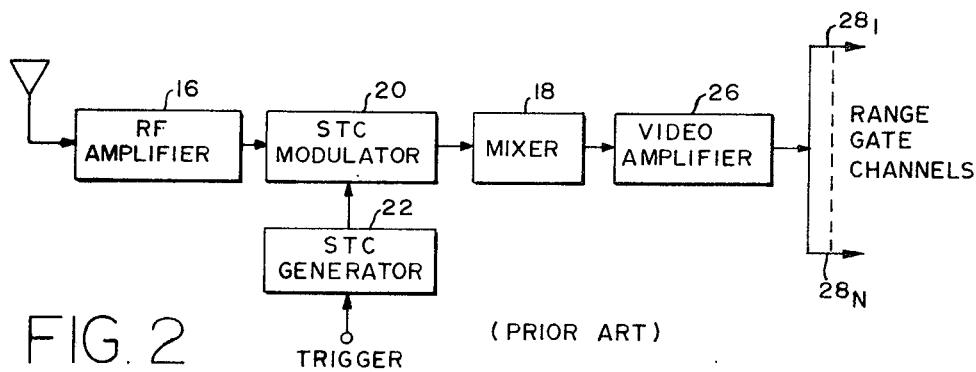
FIG. 2 is a block diagram illustrating a receiver employing active STC modulation as shown in the prior art.

In FIG. 2, a return signal is applied to an RF amplifier 16 and then coupled to a mixer 18 via a STC modulator 20, which is an active component attenuator. The signal from the RF amplifier 16 is attenuated in the STC modulator 20 by a factor dependent upon the range from whence the signal was received. The STC modulator 20 is controlled by an STC generator 22, which adjusts the gain of the receiver as a function of time in the manner illustrated by waveform 24 of curve C of FIG. 1. In practice, waveform 24 is approximated by the generation of a step function like waveform 25. Note that waveform 24 limits the gain of the receiver such that signals from close-in targets which are received in a very short time after generation of the transmitted pulse are attenuated greatly since these signals are close-in and therefore will be large signals. Signals at the maximum processing range of the receiver are attenuated only slightly, such that maximum receiver gains will be used because these signals are very weak signals. The output from the STC modulator is applied to the mixer 18 and to a video amplifier 26, in conventional fashion, with the output from the video amplifier being applied to the range gate channels $28_1$–$28_N$.

The STC modulator employs active components and is relatively complex. It requires initial alignment and periodic adjustment to compensate for drift. One major problem is that leakage from the STC generator 22 can get into the signal train and compensation for this must be made.

Figure 3:
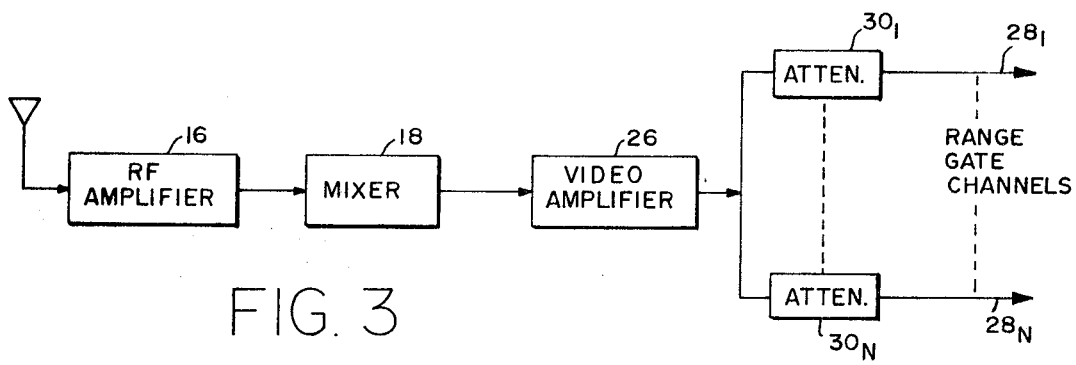
FIG. 3 is a block diagram of a first embodiment of a receiver employing passive STC modulator according to the invention.

These problems are alleviated by the system set forth in FIG. 3.

In the system of FIG. 3, return signals from targets are applied to the RF amplifier 16 of the radar receiver with the output therefrom coupled to a mixer 18 and video amplifier 26 in conventional fashion. Note the lack of any STC modulator. The output from the video amplifier consists of a pulse or pulses from return echoes from targets and is applied to the range gate channels $28_1$–$28_N$ via a plurality of attenuators $30_1$–$30_N$. The attenuators can be simple pi networks of resistors to attenuate the signals applied to the range gate channels. If range gate channels $28_1$–$28_N$ are equally spaced in time, then the attenuators $30_1$–$30_N$ will increase in attenuation by a factor proportional to the fourth power of range ($r^4$) since return signal builds up rapidly as range decreases, according to the fourth power law.

Figure 4:
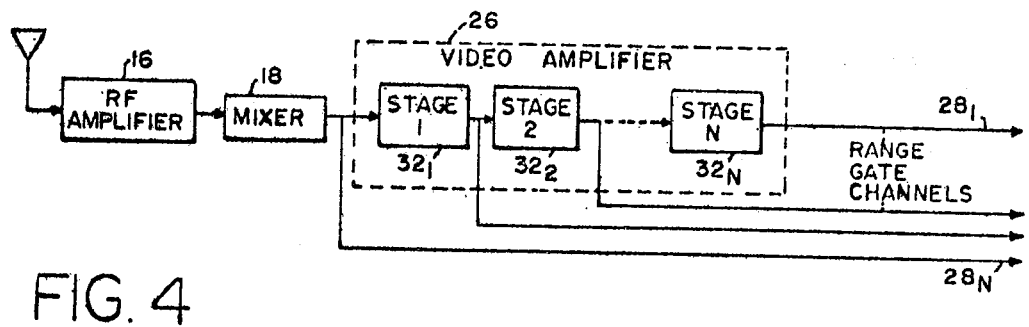
FIG. 4 is a block diagram of a second embodiment of the invention.

A second embodiment of the invention is illustrated in FIG. 4. In this embodiment video amplifier 26 comprises a number of stages, $32_1$–$32_N$. Maximum gain is achieved by picking off the signal at stage $32_N$. Therefore, signals from stage $32_N$ will be applied to range gate $28_1$, which process signals from targets at maximum range. Signals from targets closer to the receiver will be processed in range gate channels 28 coupled to earlier stages of the video amplifier 26.

In summary, sensitivity-time control for a radar receiver has been provided without the requirement for an active STC modulator by either using passive attenuators in the range gate channels or by coupling the range gate channels to predetermined different stages of the video amplifier.

Figure 5:
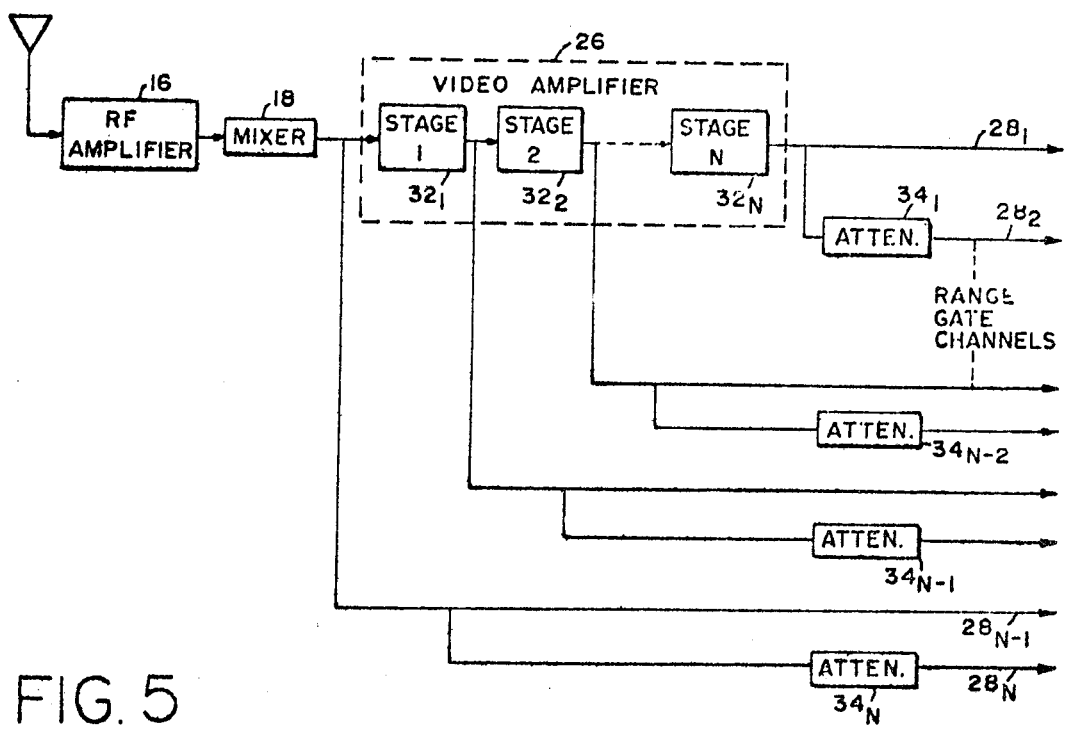
FIG. 5 is a block diagram of a third embodiment of the invention.

FIG. 5 illustrates an embodiment of the invention wherein both schemes are employed. The outputs from the video amplifier 26 are applied either directly from particular stages of the video amplifier to range gate channels or via attenuator pads. For example, the signal from a target at maximum distance, wherein maximum gain is desired, is taken at the output of stage $32_N$ of the video amplifier 26 and applied to its respective range gate channel $28_1$. A signal from a target far out from the radar system, but not quite as far as the target processed in range gate channel $28_1$, will be taken at the output of stage $32_N$ of the video amplifier 26 and applied to the range gate $28_2$ via an attenuator $34_1$. Signals from the target closest to the radar receiver will be applied to range gate channel $28_N$ via the attenuator $34_N$, whereas signals received from targets one range removed from channel $28_N$ will be at the same gain as the signal applied to $28_N$, however no attenuator is required since additional gain is required. In like fashion, other signals will be applied to their respective range gate channels either directly from a particular stage of the video amplifier or through an attenuator 34. Signals from a particular stage of the video amplifier can be applied to more than two range gate channels by the addition of other attenuators in the manner described herein.

While I have described above the principles of my invention in accordance with specific apparatus, it is to be clearly understood that the description is made only by way of example and not as a limitation of the scope of my invention, as set forth in the accompanying claims.

I CLAIM:

1. In a return echo range response system, apparatus including a receiver and a plurality of range gate channels coupled to said receiver, the improvement comprising a plurality of attenuators coupled between said receiver and respective ones of said range gate channels.

2. In a return echo range responsive system as defined in claim 1, wherein the attenuation values of said attenuators between said receiver and each of said range gate channels are different.

3. In a return echo range responsive system as defined in claim 2, wherein the relative attenuation values of said attenuators are inversely proportional to the range of signals to be processed at said range gate channels.

4. In a return echo range responsive system as defined in claim 1, wherein no attenuator is coupled to a range gate channel responsive to targets at the closest range to the system.

5. In a return echo range responsive system including a receiver and a plurality of range gate channels, said receiver having a multistage amplifier therein, the improvement comprising means for coupling said range gate channels to predetermined ones of the stages of said amplifier such that signals from predetermined different ranges will be amplified by different amounts.

6. In a return echo range responsive system as defined in claim 5, said amplifier having $n$ stages, wherein said range gate channel responsive to signals furthermost from said system is coupled to said nth stage, with other range gate channels being coupled to other stages of said amplifier.

7. In a return echo range responsive system as defined in claim 5, further including a plurality of attenuators coupling predetermined ones of said amplifier stages to predetermined ones of said range gate channels.

* * * * *